United States Patent
Jo et al.

(10) Patent No.: US 12,443,496 B2
(45) Date of Patent: Oct. 14, 2025

(54) METHOD AND SYSTEM FOR FAULT TOLERANCE

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 43 days.

(21) Appl. No.: 18/596,818

(22) Filed: Mar. 6, 2024

(65) Prior Publication Data
US 2024/0303155 A1    Sep. 12, 2024

(30) Foreign Application Priority Data

Mar. 6, 2023  (KR) .......... 10-2023-0029483
Sep. 1, 2023  (KR) .......... 10-2023-0116557

(51) Int. Cl.
- G06F 11/00 (2006.01)
- G06F 11/14 (2006.01)
- G06F 11/20 (2006.01)
- G06F 11/30 (2006.01)

(52) U.S. Cl.
CPC ........ *G06F 11/203* (2013.01); *G06F 11/1407* (2013.01); *G06F 11/143* (2013.01); *G06F 11/1438* (2013.01); *G06F 11/2025* (2013.01); *G06F 11/2028* (2013.01); *G06F 11/302* (2013.01)

(58) Field of Classification Search
CPC .............. G06F 11/1407; G06F 11/143; G06F 11/1438; G06F 11/2025; G06F 11/2028; G06F 11/203; G06F 11/302
See application file for complete search history.

(56) References Cited

U.S. PATENT DOCUMENTS

| | | | |
|---|---|---|---|
| 5,845,082 A | 12/1998 | Murakami | |
| 6,601,186 B1* | 7/2003 | Fox | G06F 11/0715 719/321 |
| 6,694,450 B1* | 2/2004 | Kidder | G06F 11/1482 714/13 |
| 6,742,134 B1* | 5/2004 | Pothier | G06F 11/0709 714/E11.138 |
| 6,983,362 B1* | 1/2006 | Kidder | G06F 11/0709 713/1 |

(Continued)

FOREIGN PATENT DOCUMENTS

| | | |
|---|---|---|
| JP | H08-110895 A | 4/1996 |
| JP | 2002-342300 A | 11/2002 |
| JP | 2006-228121 A | 8/2006 |

*Primary Examiner* — Joshua P Lottich
(74) *Attorney, Agent, or Firm* — Banner & Witcoff, Ltd.

(57) ABSTRACT

Provided is a fault tolerance method which is performed by one or more processors, and which includes receiving an application execute command, executing a main process of an application in response to the execute command, receiving, by a split execution module, information on a plurality of devices associated with the execution of the application from an orchestrator, executing, by the split execution module, a sub-process for each of the plurality of devices using the information on the plurality of devices, and performing, by the split execution module, fault tolerance associated with the execution of the application using an idle device, if a failure occurs in at least some of the plurality of devices.

10 Claims, 11 Drawing Sheets

(56) References Cited

U.S. PATENT DOCUMENTS

| | | | | |
|---|---|---|---|---|
| 7,023,845 | B1* | 4/2006 | Simons | H04L 69/40 |
| | | | | 361/752 |
| 9,806,979 | B1* | 10/2017 | Felstaine | H04L 41/0668 |
| 2002/0188653 | A1* | 12/2002 | Sun | G06F 11/1438 |
| | | | | 709/201 |
| 2006/0190759 | A1 | 8/2006 | Ide | |
| 2007/0260733 | A1* | 11/2007 | Havemose | G06F 11/1451 |
| | | | | 709/226 |
| 2014/0359627 | A1* | 12/2014 | Vermette | G06F 11/1482 |
| | | | | 718/101 |

* cited by examiner

1. If a GPU hardware fault occurs,
2. only a sub-process dies.
3. The platform automatically launches a new sub-process on another (stanby) machine, and
4. Restores the context of faulty sub-process using checkpoint/restart. Then the main process continues the execution with the new sub-process.

METHOD AND SYSTEM FOR FAULT TOLERANCE

CROSS-REFERENCE TO RELATED APPLICATION

This application claims priority under 35 U.S.C. § 119 to Korean Patent Application Nos. 10-2023-0029483, filed in the Korean Intellectual Property Office on Mar. 6, 2023, and 10-2023-0116557, filed in the Korean Intellectual Property Office on Sep. 1, 2023, the entire contents of which are hereby incorporated by reference.

BACKGROUND

Field

The disclosure relates to a method and system for fault tolerance, and specifically, to a method and system for fault tolerance to a failure occurring in a device associated with execution of an application, using a sub-process associated with the device.

Discussion of the Background

Applications (e.g., artificial intelligence applications, etc.) may fail due to various factors. For example, there may be hardware errors, network problems, user input errors, etc. The execution state of the application may be stored as a checkpoint at regular intervals in order to minimize the impact of failures that occur while the application is running. If a failure occurs, the application can be driven again using the stored checkpoint.

Additionally, the application may be run in a distributed environment in order to minimize the impact of failures that may occur while the application is running. The application running in the distributed environment has tasks distributed to multiple computers and processed in parallel, allowing work to continue to be performed by other devices even if a problem occurs in one device, thereby improving the availability and reliability of the system.

However, in at least some implementations, if a hardware error occurs in a device (e.g., GPU) associated with the application, the application may be restarted by applying regularly stored checkpoints to other devices, but situations that require user intervention may still occur frequently. Accordingly, there is an inevitable problem that service interruption will eventually occur because the user must go through the process of resetting the device.

SUMMARY

In order to solve the problems described above, the present disclosure provides a method, a non-transitory computer-readable recording medium storing instructions, and an apparatus (system) for fault tolerance.

The present disclosure may be implemented in a variety of ways, including methods, apparatus (systems) or non-transitory computer readable storage media storing instructions.

A method for fault tolerance is provided, which may be executed by one or more processors and include receiving an application execute command, executing a main process of an application in response to the execute command, receiving, by a split execution module, information on a plurality of devices associated with the execution of the application from an orchestrator, executing, by the split execution module, a sub-process for each of the plurality of devices using the information on the plurality of devices, and performing, by the split execution module, fault tolerance associated with the execution of the application using an idle device, if a failure occurs in at least some of the plurality of devices.

The receiving the information on the plurality of devices associated with the execution of the application may include transmitting, by the split execution module, a request for the information on the plurality of devices associated with the execution of the application to the orchestrator, and receiving, by the split execution module, information on a plurality of devices that are idle devices from the orchestrator in response to the request for the information on the plurality of devices.

The executing the sub-process for each of the plurality of devices may include generating, by the split execution module, a plurality of sub-processes using information on the number of devices included in the information on the plurality of devices, in which the number of the plurality of sub-processes may correspond to the number of the plurality of devices, mapping, by the split execution module, each of the plurality of generated sub-processes and each of the plurality of devices, generating, by the split execution module, an operation graph executed by each of the plurality of sub-processes, allocating, by the split execution module, the generated operation graph to each of the plurality of sub-processes, and executing, by each of the plurality of sub-processes, an operation associated with the operation graph.

The performing the fault tolerance may include identifying, by the split execution module, failure occurrence information associated with a first device of the plurality of devices, terminating, by the split execution module, a first sub-process associated with the first device, and executing, by the split execution module, a second sub-process associated with the second device which is the idle device, and a task associated with the second sub-process may correspond to a task associated with the first sub-process.

The identifying failure occurrence information associated with the first device of the plurality of devices may include receiving, by the split execution module, failure occurrence information associated with the first device from a first sub-process associated with the first device.

The identifying failure occurrence information associated with the first device of the plurality of devices may include determining, by the split execution module, that a failure occurs in the first device, in response to not receiving a response from the first sub-process associated with the first device for a predetermined period of time to a connection status check request periodically transmitted to each of the sub-processes associated with the plurality of devices.

The executing the second sub-process may include identifying, by the split execution module, a latest checkpoint associated with the first device, identifying, by the split execution module, an operation graph required for failure recovery associated with the first device, and executing, by the split execution module, the second sub-process associated with the second device using the latest checkpoint and the operation graph required for failure recovery, and the operation graph required for failure recovery may include an operation graph from a time point associated with the latest checkpoint to a time point at which the failure occurs.

The executing the second sub-process associated with the second device using the latest checkpoint and the operation graph required for failure recovery may include allocating, by the split execution module, the latest checkpoint and the operation graph required for failure recovery to the second sub-process, restoring, by the second sub-process, data associated with the first device using the latest checkpoint, and executing, by the second sub-process, an operation associated with the operation graph required for failure recovery.

A non-transitory computer-readable recording medium storing instructions for executing a method for fault tolerance on a computer is provided.

An information processing system may include a communication module, a memory, and one or more processors connected to the memory and configured to execute one or more computer-readable programs included in the memory, in which the one or more programs may include instructions for receiving an application execute command, executing a main process of an application in response to the execute command, receiving, by a split execution module, information on a plurality of devices associated with the execution of the application from an orchestrator, executing, by the split execution module, a sub-process for each of the plurality of devices using the information on the plurality of devices, and performing, by the split execution module, fault tolerance associated with the execution of the application using an idle device, if a failure occurs in at least some of the plurality of devices.

Even if a device-related problem occurs, resulting in abnormal interruption of a specific sub-process responsible for application operation, it is possible to continue working from the latest execution state by executing a new sub-process. Through this, continuity of the application operation can be maintained.

According to some examples of the present disclosure, even if a specific device responsible for the operation fails while an application is running, a process associated with an idle device can be automatically generated. The work performed in the process of the failed device can be automatically switched to the newly generated process and the failure can be restored without separate user intervention, thereby improving the availability and reliability of the system.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
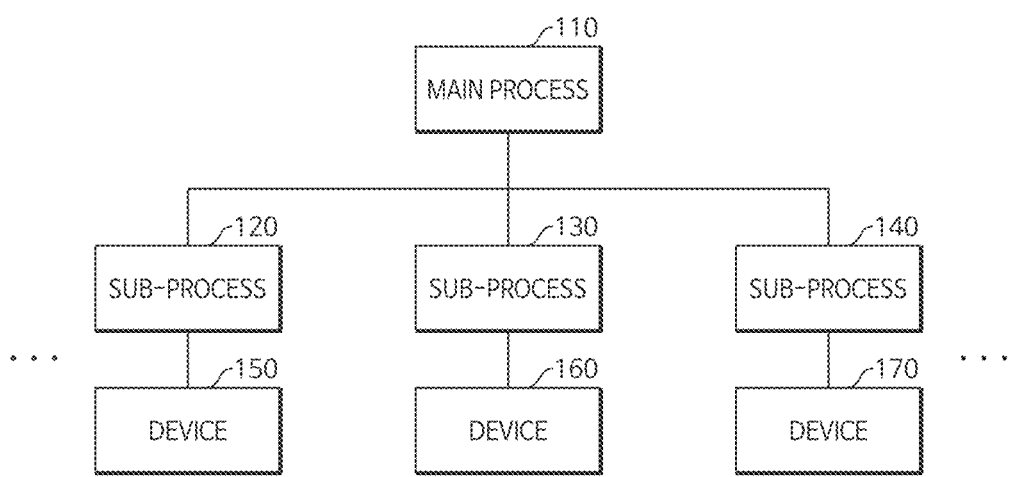
FIG. 1 is a diagram illustrating an example of a main process and sub-processes for fault tolerance of an application to a device failure.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. A "processor" should be broadly interpreted to include general-purpose processors, central processing units (CPUs), microprocessors, digital signal processors (DSPs), controllers, microcontrollers, state machines, accelerators, etc. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in combination with a DSP core, a combination of any accelerators, or a combination of any other such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

In the present disclosure, "application" or "program" may refer to a program that performs processing including operations, etc. associated with a machine learning model and/or an artificial neural network model. For example, the application or program may refer to a program associated with deep learning operation.

In the examples of the present disclosure, "artificial intelligence operation" may refer to any operation associated with a machine learning model (e.g., an artificial neural network model, etc.). For example, an artificial intelligence operation may be an operation performed in each layer included in an artificial neural network model. For example, the artificial intelligence operation may include an addition operation, a subtraction operation, a maximum value calculation operation, a minimum value calculation operation, a floating point multiplication operation, weighting operation, convolution operation, matrix multiplication operation, batch normalization operation, Recitified Linear Unit (ReLU) operation, pooling operation, Long Short-Term Memory (LSTM) operation, Gated Recurrent Unit (GRU) operation, etc. performed in a layer included in an artificial neural network model, but is not limited thereto.

In the present disclosure, an "operation graph" may refer to a graph that is generated to efficiently execute a program and has the same meaning as a program and/or information associated therewith. For example, the operation graph is an intermediate expression generated after operation processing of input data and may include information on the input and output data, operation order, etc. for artificial intelligence operation. The operation graph may be expressed by one or more nodes and one or more edges.

In the present disclosure, a "device" may refer to a processor that performs a computing task or an apparatus including such a processor. For example, the "device" may refer to a Central Processing Unit (CPU) responsible for executing programs and general operations, any processing unit including the CPU, or any apparatus including the CPU. Additionally or alternatively, the "device" may refer to an accelerator which is hardware designed to accelerate a specific task, or any processing unit including the accelerator, or any apparatus including the accelerator. For example, an "accelerator" may include, but is not limited to, a Graphics Processing Unit (GPU), a Neural Processing Unit (NPU), a Tensor Processing Unit (TPU), etc.

In the present disclosure, "process" may mean an instance of an application or program running on a computer. The process may be managed by the operating system and include a set of codes allocated to a memory, data, and execution state, etc. Separate software may be provided for control and management of processes through the device.

In the present disclosure, "fault tolerance" may refer to an ability of a system to operate smoothly and perform functions without interruption even if a fault occurs due to internal or external factors. For example, a "fault tolerance method" may refer to a method and/or procedure of a system operating smoothly and performing functions without interruption even if a fault occurs due to internal or external factors.

In the present disclosure, "checkpoint" relates to a function of storing the execution state of a program and data associated therewith and later resuming execution from that state, and the checkpoint may refer to storing the execution state of a program or system and data associated therewith.

FIG. 1 illustrates an example of a main process 110 and sub-processes 120, 130, and 140 for fault tolerance of an application to a failure of a device. A processor (one or more processors of an information processing system or user terminal) may execute the main process 110 and a plurality of sub-processes 120, 130, and 140 of the application (e.g., a software application, a computer program, etc. that is associated with a plurality of devices, such as GPUs, NPUs, AI processors, etc.). The main process 110 is an instance of a program executed on a computing apparatus, that is, an instance of an application (e.g., an application process, such as an application process associated with a plurality of sub-processes, an application process associated with an artificial intelligence (AI) framework, a deep learning framework, and/or a machine learning framework, such as PyTorch, etc.), and may include a set of codes allocated to a memory, data, and execution states. For example, the main process 110 may process tasks for the application to perform, communicate and interact with other processes or the operating system, and process errors and/or exceptions that may occur during the execution of the application. The main process 110 may comprise a first executed program portion associated with a main software program (e.g., an application process of an application associated with an AI framework, such as a Pytorch program, etc.) and a second executed program portion configured to control each of a plurality of executed program portions associated with a plurality of sub-processes. For example, each of the plurality of sub-processes 120, 130, and 140 may comprise an executed program portion of the respective one of the plurality of sub-processes 120, 130, and 140 and a second executed program portion associated with a device driver (e.g., a GPU driver, an NPU driver, etc.).

In addition, the plurality of sub-processes 120, 130, and 140 may be the processes that actually perform operations using a plurality of devices 150, 160, and 170 in relation to the execution of the application.

Each of the plurality of sub-processes 120, 130, and 140 may be a process for each of the plurality of devices 150, 160, and 170 associated with the application. The plurality of devices 150, 160, and 170 may refer to accelerators. For example, the devices may refer to a Graphics Processing Unit (GPU), etc., but are not limited thereto. Specifically, the processor may generate a sub-process and map a corresponding device. For example, the first sub-process 120 may be mapped to the first device 150, and the second sub-process 130 and third sub-process 140 may be mapped to the second device 160 and the third device 170, respectively.

The main process 110 running on the processor may use an idle device to perform fault tolerance associated with the execution of the application. For example, if a failure occurs in any one of the plurality of devices 150, 160, and 170 that actually perform operations, the processor may execute a sub-process associated with an idle device to continue performing tasks without affecting the operation of the application.

The processor may use an idle device to perform fault tolerance associated with the execution of the application. For example, if a failure occurs in any one of the plurality of devices 150, 160, and 170 that actually perform operations, the processor may execute a sub-process associated with an idle device to continue performing tasks without affecting the operation of the application.

The processor may use a checkpoint to perform fault tolerance associated with the execution of the application. For example, during the execution of the application, the processor may periodically generate checkpoints including data required for restoration of the application. Additionally, the processor may identify the latest checkpoint among the plurality of generated checkpoints and perform fault tolerance using the identified latest checkpoint.

The main process and the sub-processes herein may be included in an AI framework (or deep learning framework). Unlike the related AI frameworks, the main process that executes the application and the sub-processes that are associated with device operations may be separately executed without the user's explicit intervention or setting. In other words, the corresponding processes may be executed with separate runtimes. Under this configuration, if a failure occurs in one device, this affects only the sub-process corresponding to the corresponding device. That is, if a device failure occurs, this affects only the sub-process associated with the failure, and accordingly, the sub-process associated with the failure is terminated, and a sub-process corresponding to a device different from the device associated with the terminated sub-process may be newly executed.

Under this configuration, even if a sub-process is abnormally stopped due to a device-related problem, tasks may be continued from the latest execution state by executing a new sub-process, so continuity of application operation can be maintained.

Figure 2:
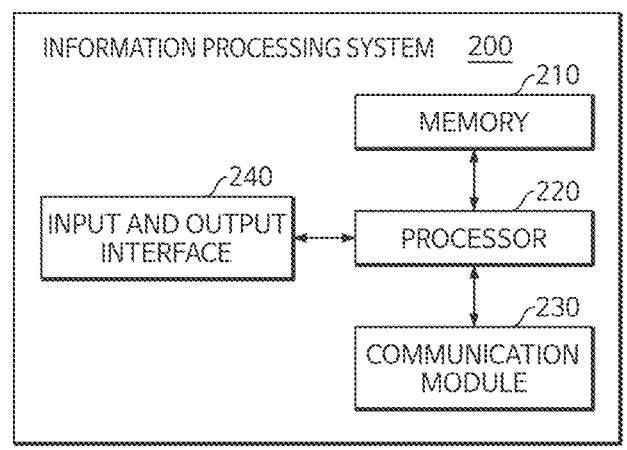
FIG. 2 is a block diagram illustrating an internal configuration of an information processing system.

FIG. 2 is a block diagram illustrating an internal configuration of an information processing system 200. The information processing system 200 may include a memory 210, a processor 220, a communication module 230, and an input and output interface 240. The information processing system 200 may be configured to communicate information and/or data through a network using the communication module 230.

The memory 210 may include any computer readable medium. The memory 210 may include a non-transitory computer readable recording medium, and may include a permanent mass storage device such as read only memory (ROM), disk drive, solid state drive (SSD), flash memory, etc. In another example, a non-destructive mass storage device such as ROM, SSD, flash memory, disk drive, etc. may be included in the information processing system 200 as a separate permanent storage device that is distinct from the memory. In addition, the memory 210 may store an operating system and at least one program code (e.g., a code for executing a process on a device, etc.).

These software components may be loaded from a computer-readable recording medium separate from the memory 210. Such a separate computer-readable recording medium may include a recording medium directly connectable to the information processing system 200, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for executing a process on a device, etc.) installed by files provided by developers or a file distribution system that distributes application installation files through the communication module 230.

The processor 220 may be configured to process the instructions of the computer program by performing basic arithmetic, logic, and input and output operations. The processor 220 may include a plurality of processors. For example, the processor 220 may include some or all of a processor and a plurality of devices for executing the main process and executing and managing the sub-processes. Alternatively, instead of being included in the information processing system 200, a plurality of devices may be included in a separate apparatus or system that is accessible to or in communication through the communication module 230. The commands may be provided to a user terminal (not illustrated) or another external system by the memory 210 or the communication module 230. The processor 220 may be configured to receive an application execute command from the user terminal and, in response to the execute command, execute the main process of the application. According to another example, if a plurality of devices are not included in the processor 220, in response to the execute command, the processor 220 may provide a command for executing a plurality of sub-processes for a plurality of devices associated with the application to the plurality of devices through the communication module 230.

The communication module 230 may provide a configuration or function for the user terminal and the information processing system 200 to communicate with each other through a network, and provide a configuration or function for the information processing system 200 to communicate with an external system (e.g., a separate cloud system, a server system, a storage system, etc.). Additionally, if a plurality of devices are not included in the information processing system, the processor 220 may be configured to communicate with each of the plurality of devices.

For example, control signals, commands, data, and the like provided under the control of the processor 220 of the information processing system 200 may be transmitted to the user terminal and/or the external system through the communication module 230 and the network through the communication module of the user terminal and/or an external system. The processor 220 may provide information on a device failure associated with the execution of the application to a user terminal (not shown) executing the application.

In addition, the input and output interface 240 of the information processing system 200 may be a means for interfacing with an apparatus (not illustrated) for inputting or outputting, which may be connected to the information processing system 200 or included in the information processing system 200. In FIG. 2, the input and output interface 240 is illustrated as a component configured separately from the processor 220, but aspects are not limited thereto, and the input and output interface 240 may be configured to be included in the processor 220. The information processing system 200 may include more components than those illustrated in FIG. 2. Meanwhile, most of the related components may not necessarily require exact illustration.

Figure 3:
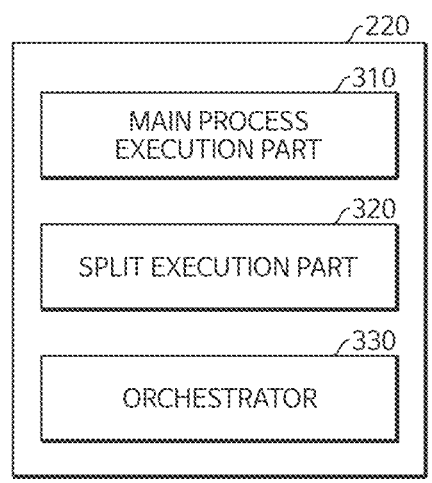
FIG. 3 is a block diagram illustrating an internal configuration of the processor 220.

FIG. 3 is a block diagram illustrating an internal configuration of the processor 220. As illustrated in FIG. 3, the processor 220 may include a main process execution module 310, a split execution module 320, and an orchestrator 330.

In response to an application execute command, the main process execution module 310 may execute the main process of the application. The main process may include a set of codes allocated to the memory in relation to the execution of the application, data, and execution status, etc. Additionally, the main process may interact with the operating system and perform tasks such as resource allocation, scheduling, memory management, etc. in relation to the execution of the application.

The split execution module 320 may refer to a module of the main process that generates and manages sub-processes and allocates tasks such that tasks associated with the application may be performed in a distributed environment. Additionally, the orchestrator 330 may be a module that identifies an idle device to perform operations associated with the application and transmits device information required for the tasks to the split execution module 320.

The split execution module 320 may be assigned a plurality of devices associated with the execution of the application from the orchestrator 330 and generate a sub-process for each of the plurality of devices. For example, the split execution module 320 may transmit a request for information on the plurality of devices associated with the execution of the application to the orchestrator 330. The split execution module 320 may receive the information on the plurality of devices that are idle devices from the orchestrator 330. The split execution module 320 may generate a plurality of sub-processes as many as the number of devices based on the information on the plurality of devices.

The split execution module 320 may map devices corresponding to each of the plurality of generated sub-processes. The split execution module 320 may generate an operation graph executed by each of the plurality of sub-processes, and assign the generated operation graph to each of the plurality of sub-processes. Each of the sub-processes may independently execute an operation associated with the allocated operation graph.

The plurality of devices may be included in the processor 220. Alternatively, the plurality of devices may be placed in an apparatus or system that is accessible to or in communication with the processor 220. Additionally, at least some of the plurality of devices may be configured in a cluster form. Additionally or alternatively, the plurality of devices may include one system or two or more systems.

If a failure occurs in at least some of the plurality of devices, the split execution module 320 may perform fault tolerance associated with the execution of the application by switching sub-processes using idle devices. To this end, the split execution module 320 may identify failure occurrence information associated with a specific device of a plurality of devices.

For example, the split execution module 320 may identify failure occurrence information associated with a specific device by receiving the failure occurrence information associated with the specific device from a sub-process associated with the specific device. In another example, the split execution module 320 may periodically transmit a connection status check request to the sub-process associated with each device. If there is no response from a specific sub-process for a predetermined period of time in response to the connection status check request, the split execution module 320 may determine that a failure occurred in the corresponding device.

The split execution module 320 may terminate the sub-process associated with the failed device and exclude the sub-process from the tasks associated with the application. For example, the split execution module 320 may transmit information on the failed device to the orchestrator 330 and cause the orchestrator 330 to exclude the corresponding device from a list of workable devices.

The split execution module 320 may execute a new sub-process associated with one of the idle devices. The task of the new sub-process herein may correspond to the task of the sub-process associated with the failed device. In this case, the split execution module 320 may use a checkpoint and an intermediate expression to restore the task associated with the failed device and execute a new sub-process associated with the newly allocated device.

To this end, the split execution module 320 may execute a sub-process associated with the idle device using the data required for restoration. For example, the split execution module 320 may identify the latest checkpoint based on the checkpoint that includes the data required for restoration. Additionally, the split execution module 320 may identify an operation graph required for failure recovery of the failed device. The operation graph required for failure recovery may include an operation graph from a time point associated with the latest checkpoint to a time point at which the failure occurs.

The split execution module 320 may execute a new sub-process associated with the newly allocated device using the latest checkpoint and the operation graph required for failure recovery. The new sub-process may use the data stored in the checkpoint to restore data to the memory of the newly allocated device and execute an operation associated with the operation graph required for failure recovery.

The processor 220 may further include a data storage unit that acquires data required for restoration of the application. The data storage unit may generate a checkpoint including the data required for restoration of the application during the execution of the application. The checkpoints may be generated at predefined time interval. In other examples, the checkpoints may be generated if a predefined event occurs. For example, the checkpoints may be generated if the system resource usage exceeds a threshold value, or if each task associated with the application is completed, or if an error occurs.

The internal configuration of the processor 220 illustrated in FIG. 3 is only an example, and in some examples, configurations other than the illustrated internal configuration may be additionally included, or some configurations may be omitted, and some processes may be performed by other configurations or external systems. In addition, although the internal components of the processor 220 are described separately for each function in FIG. 3, it does not necessarily mean that they are physically separated.

Figure 4:
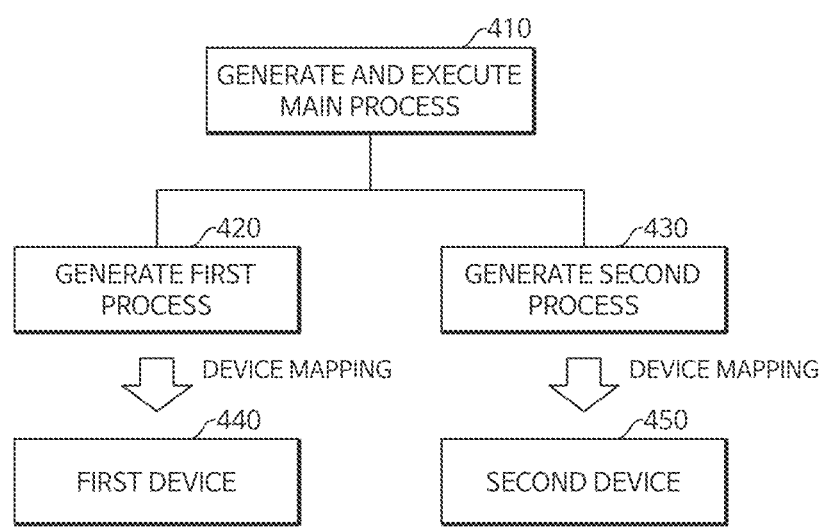
FIG. 4 is a diagram illustrating an example of generating a plurality of sub-processes and mapping the sub-processes to a device in response to an application execute command.

FIG. 4 is a diagram illustrating an example of generating a plurality of sub-processes and mapping the sub-processes to a device in response to an application execute command. In response to the application execute command, a processor (e.g., one or more processors of the information processing system or user terminal) may generate and execute (410) a main process. Additionally, the processor may generate (420 and 430) a plurality of sub-processes associated with a plurality of devices 440 and 450 responsible for calculating the application.

Specifically, the processor may cause the split execution module to receive information on a plurality of devices associated with the execution of the application from the orchestrator. In this case, the plurality of devices may be devices in an idle state. The processor may cause the split execution module to associate a sub-process with each of the plurality of devices using the information on the plurality of devices.

For example, the split execution module may receive information on the first and second idle devices 440 and 450 assigned by the orchestrator. The split execution module may use the received device information (e.g., identification information and/or information on number of allocated devices, etc.) to generate (420 and 430) a first sub-process and a second sub-process. In this case, the number of generated plurality of sub-processes may correspond to the number of plurality of devices. The split execution module may map each of the generated first and second sub-processes to the first device 440 and the second device 450. FIG. 4 shows an example of generating two sub-processes and associating the sub-processes with two devices, but the number of sub-processes and devices is not limited thereto, and the process may generate two or more sub-processes and associate these sub-processes with two or more devices, respectively.

The processor may cause the split execution module to generate an operation graph executed by each of the plurality of sub-processes, and assign the generated operation graph to each of the plurality of sub-processes. For example, the split execution module may generate operation graphs executed by each of the first and second sub-processes and assign the operation graphs to each of the first and second sub-processes. The first sub-process and the second sub-process may execute the operations associated with the corresponding operation graphs.

The main process and a plurality of sub-processes may each operate on physically distributed processors. In this case, the application may be operated through communication between the main process and a plurality of sub-processes. For example, the main process may represent a process generated and executed on a user terminal running the application. Alternatively, the main process may represent a process generated and executed on a front-end server associated with the application. In this case, the sub-process may represent a process generated and executed on a back-end server responsible for operations using devices. The front-end server and the back-end server may be included in the information processing system (e.g., 200 in FIG. 2). Alternatively, only a part of the front-end server and back-end server may be included in the information processing system (e.g., 200 in FIG. 2). Alternatively, the front-end server and back-end server may be included in an external system that is accessible to or in communication with the information processing system (e.g., 200 in FIG. 2).

Figure 5:
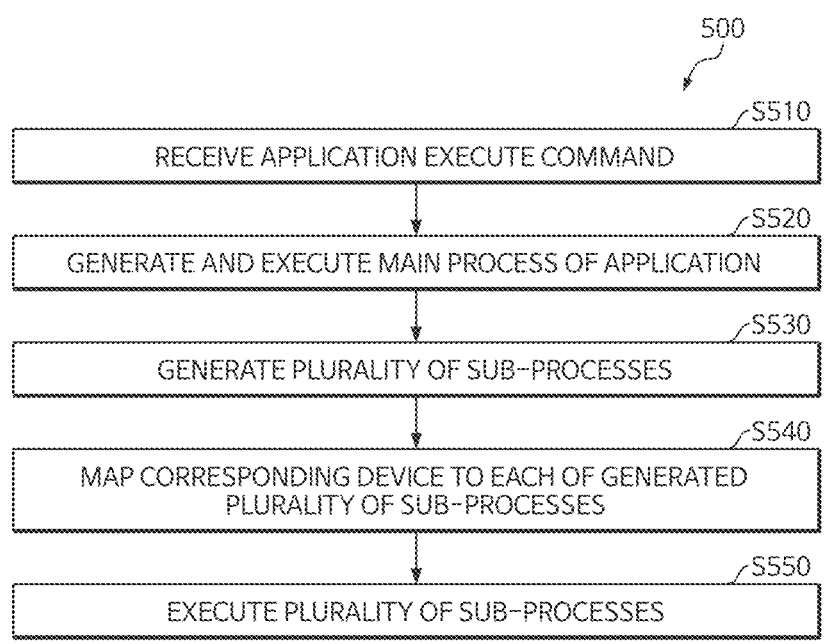
FIG. 5 is a flowchart illustrating an example of a method for executing a main process and a plurality of sub-processes in response to an application execute command.

FIG. 5 is a flowchart illustrating an example of a method 500 for executing a main process and a plurality of sub-processes in response to an application execute command. The method 500 may be initiated by a processor (e.g., one or more processors of the information processing system or user terminal) receiving an application execute command, at S510. The processor may generate and execute the main process of the application in response to the application execute command, at S520.

The processor may generate a plurality of sub-processes using the split execution module, at S530. For example, the processor may cause the split execution module to receive, from the orchestrator, information on a plurality of devices associated with the execution of the application. In addition, the processor may cause the split execution module to execute a sub-process for each of the plurality of devices using information on the plurality of devices.

The processor may cause the split execution module to map each of the plurality of generated sub-processes to the corresponding device, at S540. The processor may cause the split execution module to execute a plurality of sub-processes, at S550.

The split execution module may refer to a module of the main process that generates and manages sub-processes and allocates tasks such that the tasks associated with the application may be performed in a distributed environment. In addition, the orchestrator may be a module that identifies idle devices to perform operations associated with the application and transmits device information required for the operation to the split execution module 320.

Figure 6:
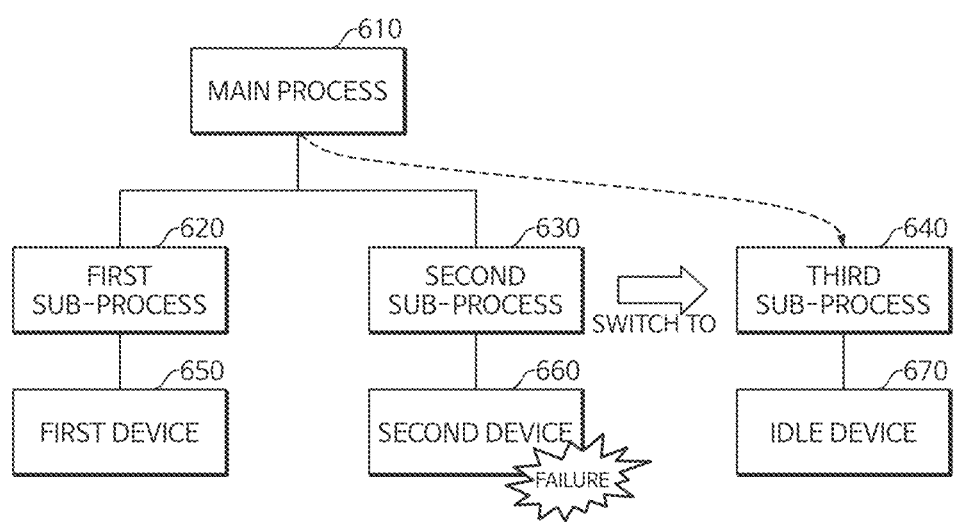
FIG. 6 is a diagram illustrating an example of performing fault tolerance using an idle device if a device failure occurs.
Figure 11:
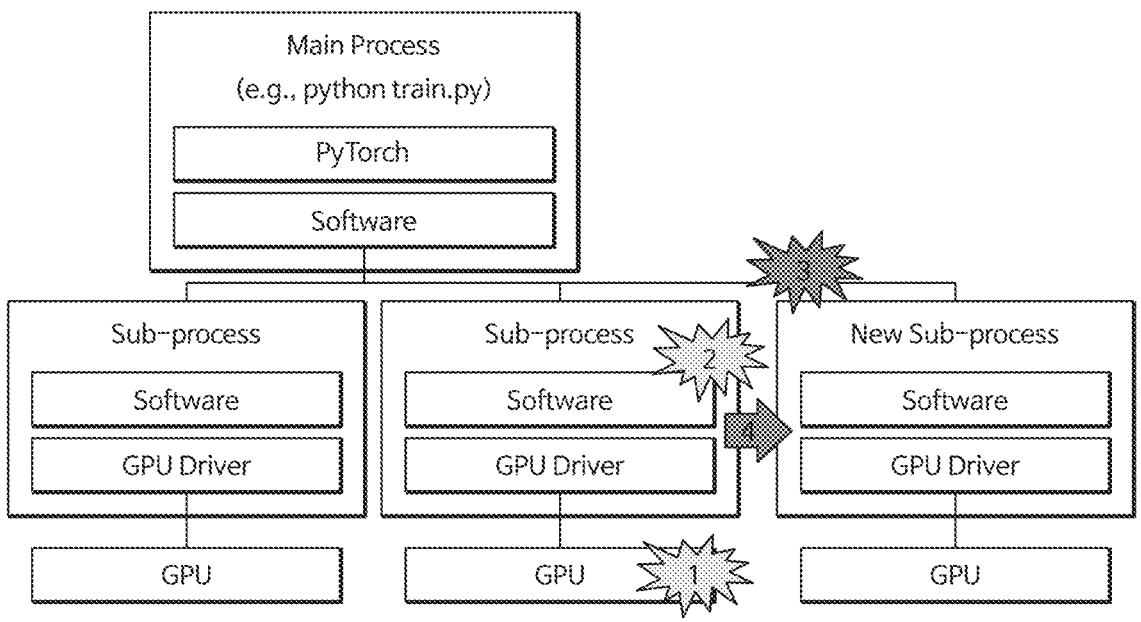
FIG. 11 is a diagram illustrating an example of performing fault tolerance using an idle device if a device failure occurs.

FIG. 6 and FIG. 11 are diagrams illustrating an example of performing fault tolerance using an idle device if a device failure occurs. If a failure associated with a specific device of a plurality of devices occurs, a processor (e.g., one or more processors of the information processing system or user terminal) may terminate a sub-process associated with the failed device and execute a sub-process associated with an idle device. In this case, the task of the sub-process associated with the idle device corresponds to the task of the sub-process associated with the failed device, so the application may operate normally without being affected by the device failure.

For example, as shown in FIG. 6, if the application is executed, a main process 610 may be generated and executed. Through the split execution module of the main process playing the role of generating sub-processes and allocating tasks, a first sub-process 620 associated with a first device 650 and a second sub-process 630 associated with a second device 660 may be generated and executed.

In this case, if a failure occurs in the second device 660, the split execution module may terminate the second sub-process 630. For example, the split execution module may receive failure occurrence information from the second sub-process 630 associated with the failed second device 660, and in response, terminate the second sub-process 630. In another example, if there is no response from the failed second sub-process for a predetermined period of time in response to the connection status check request periodically transmitted to each sub-process, the split execution module may determine that the second device failed and terminate the second sub-process 630.

Next (or at the same time), the processor may execute a third sub-process 640 associated with an idle device 670. For example, the processor may cause the split execution module to execute the third sub-process 640 and associate it with the idle device 670.

The processor may cause the split execution module to apply the latest execution state associated with the second device to the idle device 670 to recover the failure in the second device 660. For example, for failure recovery, by applying a checkpoint including the latest execution state and an operation graph required for failure recovery associated with the second device to the idle device 670, the failure for the second device 660 may be recovered. The operation graph required for failure recovery may include an operation graph from a time point associated with the latest checkpoint to a time point at which the failure occurs.

In this case, another process (e.g., main process or another sub-process) performing tasks associated with a second sub-process 630 of the failed second device 660 may remain in a waiting state until the third sub-process 640 of the idle device 670 restores data and is executed. For example, another process may remain in the waiting state until the third sub-process 640 of the idle device 670 generates result data and receives the same. In another example, another process may remain in the waiting state until the third sub-process 640 may receive data generated by the corresponding process.

Similar to the example shown in FIG. 6, FIG. 11 shows an example of performing fault tolerance using an idle device if a device failure occurs. One or more computing devices may detect a failure (e.g., a hardware fault, such as a processor hardware fault, a GPU hardware fault, an NPU hardware fault, a CPU hardware fault, etc.). Based on the fault, a sub-process associated with the failure (e.g., a sub-process associated with a failure of the hardware component) may not be processed and may be inoperable (e.g., the sub-process may die). The one or more computing devices may automatically launch a new sub-process on another machine (e.g., a standby hardware component) to replace the dead sub-process. The one or more computing device may restore the context of the faulty sub-process using information about one or more checkpoints of the dead sub-process and/or other pieces of information of the dead sub-process. The main process may continue the execution with the new sub-process.

Figure 7:
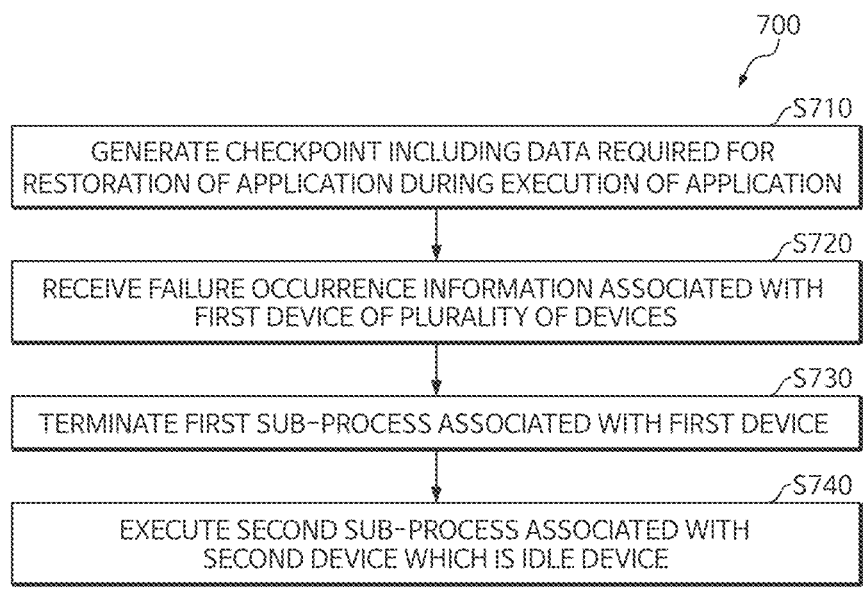
FIG. 7 is a flowchart illustrating an example of a method for performing fault tolerance using an idle device.

FIG. 7 is a flowchart illustrating an example of a method 700 for performing fault tolerance using an idle device. The method 700 may be initiated by a processor (e.g., one or more processors of the information processing system or user terminal) generating a checkpoint necessary for restoration of the application during the execution of the application, at S710. The checkpoints may be generated at predefined time interval. For example, the processor may store execution state information of the application every 1 minute, but the time interval at which checkpointing is performed is not limited to the example described above. Additionally or alternatively, the checkpoints may be generated if a predefined event occurs. For example, the processor may store execution state information of the application, if system resource usage exceeds a threshold, or if each task associated with the application is completed, or if an error occurs.

Additionally, the processor may store an operation graph associated with the operation of the application performed between the cycles in which checkpoints are generated. For example, the processor may sequentially store an operation graph associated with the operation performed between a first time point at which a particular checkpoint is stored and a second time point at which the next checkpoint is stored. The operation graph stored between the first time point and the second time point may be stored as a checkpoint at the second time point and deleted.

The processor may receive failure occurrence information associated with the first device of the plurality of devices, at S720. The failure occurrence information associated with the device may be an error message or timeout. The processor may terminate the first sub-process associated with the first device, at S730. Specifically, the processor may exclude the first sub-process associated with the first device from the tasks to be performed in association with the application.

The processor may execute a second sub-process associated with the second device which is an idle device, at S740. The task associated with the second sub-process may correspond to the task associated with the first sub-process. Specifically, the processor may apply the latest execution state information of the failed first device to the second sub-process associated with the second device which is an idle device to recover the failure. For example, the processor may recover the failure by applying, to the second sub-process associated with the second device, which is an idle device, the execution state information stored in the latest checkpoint of the failed first device, and the operation graph associated with the application operation from the latest checkpoint time point to the failure occurrence time point.

Figure 8:
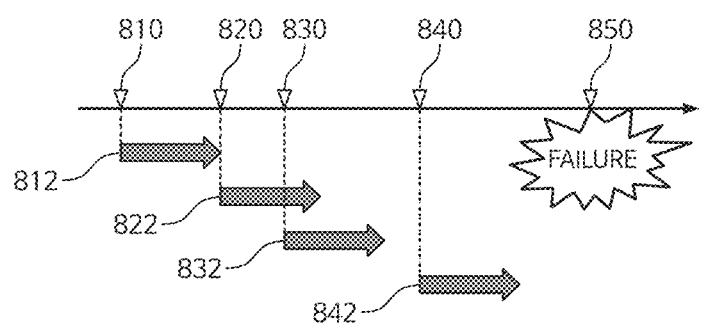
FIG. 8 is a diagram illustrating an example of generating a checkpoint including data required for restoration of an application.

FIG. 8 is a diagram illustrating an example of generating a checkpoint including data required for restoration of the application. A processor (e.g., one or more processors of the information processing system or user terminal) may generate a checkpoint including the data required for restoration of the application during the execution of the application. The data required for restoration of the application may refer to the latest execution state associated with the corresponding device and data associated with the same.

The checkpoints may be generated at predefined time interval (e.g., 30 seconds). Additionally or alternatively, the checkpoints may be generated if a predefined event occurs. For example, the checkpoints may be generated if an event occurs, such as if the system resource usage exceeds a threshold or if an error occurs. The event may be set in advance.

FIG. 8 shows an example of regularly generated checkpoints and aperiodically generated checkpoints. The checkpoints may progress at predefined time interval, as illustrated by a first checkpoint 812 and a second checkpoint 822. For example, the time interval between a first time point 810 at which the first checkpoint 812 starts and a second time point 820 at which the second checkpoint starts may be a predefined time interval. In another example, if the time interval at which the checkpoint progresses is constant, the second time point 820 at which the second checkpoint starts may be synchronized with the time point at which the first checkpoint 812 is completed.

The checkpoints may be generated aperiodically, as illustrated by a third checkpoint 832 and a fourth checkpoint 842. For example, the time interval between the third time point 830 at which the third checkpoint starts and the fourth time point 840 at which the fourth checkpoint starts may not be constant. For example, the third time point 830 and the fourth time point 840 may refer to when an event occurs such as when the system resource usage exceeds a threshold value or when an error occurs, but aspects are not limited thereto.

While it is illustrated herein that both of a case of periodically generating checkpoints and a case of aperiodically generating checkpoints are included in one time table, aspects are not limited thereto. For example, the process may only generate checkpoints periodically. In another example, the processor may generate checkpoints aperiodically, i.e., if an event occurs. Additionally, the checkpoint shown in FIG. 8 may be generated for each of a plurality of devices.

Figure 9:
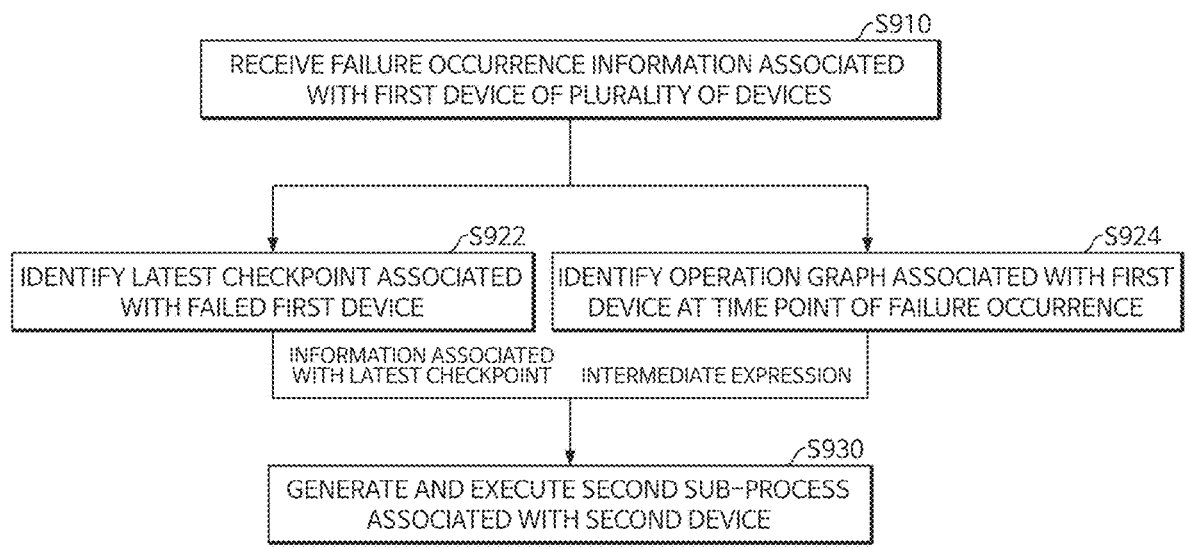
FIG. 9 is a flowchart illustrating an example of a specific method for performing fault tolerance using an idle device.

FIG. 9 is a flowchart illustrating an example of a specific method 900 for performing fault tolerance using an idle device. The method 900 may be initiated by a processor (e.g., one or more processors of the information processing system or user terminal) receiving failure occurrence information associated with a first device of a plurality of devices, at S910.

The failure occurrence information associated with the device may be an error message. For example, the processor may cause the split execution module to receive the failure occurrence information associated with the first device from a first sub-process associated with the first device. In another example, the failure occurrence information associated with the device may be a timeout. For example, the processor may cause the split execution module to determine that a failure occurs in the first device, in response to not receiving a response from the first sub-process associated with the first device for a predetermined period of time to a connection status check request periodically transmitted to each of the sub-processes associated with the plurality of devices.

In response to receiving the failure occurrence information, the processor may terminate the first sub-process associated with the first device. Specifically, the processor may cause the split execution module to exclude the first sub-process associated with the first device from the tasks to be performed in association with the application. In addition, the processor may cause the split execution module to transmit the corresponding information to the orchestrator so as not to allocate the first device as a workable device.

The processor may acquire the latest execution state information associated with the first device for failure recovery. The latest execution state information associated with the first device may include any data (e.g., input and output data, parameter data, operation data, etc.) for artificial intelligence operation associated with the first device in relation to application operation. For example, the processor may cause the split execution module to identify the latest checkpoint associated with the failed first device, at S922. Additionally, the processor may identify an operation graph required for failure recovery associated with the first device, at S924. The latest checkpoint associated with the first device may include data and data values associated with the first device. Additionally, the operation graph required for failure recovery associated with the first device may include at least one operation graph associated with the operations performed on the first device from a time point associated with the latest checkpoint to a time point at which the failure occurs. The operation graph may refer to a graph generated for artificial intelligence operation and/or information associated therewith, which is generated to efficiently execute artificial intelligence operation. The operation graph is an intermediate expression generated after processing the operation of the input data, and may include the execution state information of the application.

The processor may cause the split execution module to create and execute a second sub-process associated with the newly allocated second device using the latest checkpoint and the operation graph required for failure recovery, at S930. The second sub-process may use the data stored in the checkpoint to restore the data to the memory of the newly allocated second device and execute an operation associated with the operation graph required for failure recovery.

Figure 10:
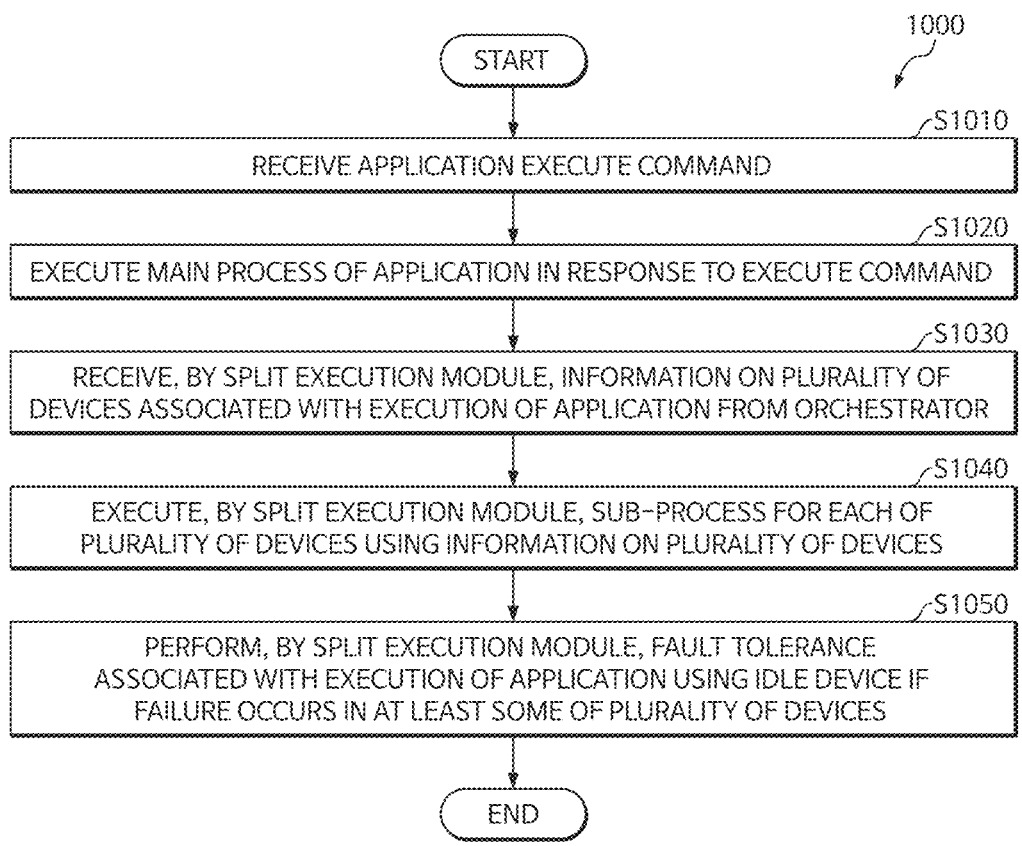
FIG. 10 is a flowchart illustrating an example of a method for performing fault tolerance.

FIG. 10 is a flowchart illustrating an example of a method 1000 for performing fault tolerance. The method 1000 may be initiated by a processor (e.g., one or more processors of the information processing system or user terminal) receiving an application execute command, at S1010. In response to the execute command, the processor may execute the main process of the application, at S1020.

The processor may cause the split execution module to receive, from the orchestrator, information on a plurality of devices associated with the execution of the application, at S1030. For example, the processor may cause the split execution module to transmit a request for the information on the plurality of devices associated with the execution of the application to the orchestrator. In response to the request for the information on the plurality of devices, the processor may cause the split execution module to receive the information on the plurality of devices that are idle devices from the orchestrator.

In addition, the processor may cause the split execution module to execute a sub-process for each of the plurality of devices using the information on the plurality of devices, at S1040. For example, the processor may cause the split execution module to generate a plurality of sub-processes using the information on the number of devices included in the information on the plurality of devices. The processor may cause the split execution module to map each of the plurality of generated sub-processes and each of the plurality of devices. In this case, the number of plurality of sub-processes may correspond to the number of plurality of devices.

The processor may cause the split execution module to generate an operation graph executed by each of the plurality of sub-processes. In addition, the processor may cause the split execution module to allocate the generated operation graph to each of the plurality of sub-processes. The processor may execute an operation associated with the operation graph through each of the plurality of sub-processes.

If a failure occurs in at least some of the plurality of devices, the processor may cause the split execution module to perform fault tolerance associated with the execution of the application using an idle device, at S1050. Specifically, the processor may cause the split execution module to identify failure occurrence information associated with a first device of the plurality of devices.

For example, the processor may cause the split execution module to receive the failure occurrence information associated with the first device from a first sub-process associated with the first device. In another example, the processor may cause the split execution module to determine that a failure occurs in the first device, in response to not receiving a response from the first sub-process associated with the first device for a predetermined period of time to a connection status check request periodically transmitted to each of the sub-processes associated with the plurality of devices.

The processor may cause the split execution module to terminate the first sub-process associated with the first device. The processor may cause the split execution module to execute a second sub-process associated with the second device which is an idle device. The task associated with the second sub-process may correspond to the task associated with the first sub-process.

Specifically, the processor may cause the split execution module to identify the latest checkpoint associated with the first device. Additionally, the processor may cause the split execution module to identify an operation graph required for failure recovery associated with the first device. The processor may cause the split execution module to execute the second sub-process associated with the second device using the latest checkpoint and the operation graph required for failure recovery. The operation graph required for failure recovery may include an operation graph from a time point associated with the latest checkpoint to a time point at which the failure occurs.

For example, the processor may cause the split execution module to allocate the latest checkpoint and the operation graph required for failure recovery to the second sub-process. In addition, the processor may cause the second sub-process to restore the data associated with the first device using the latest checkpoint. The processor may cause the second sub-process to execute the operation associated with the operation graph required for failure recovery.

The flowchart illustrated in FIG. 10 and the above description are merely examples, and may be implemented differently in some other examples. For example, one or more operations may be omitted or implemented by a different configuration, the order of operations may be changed, one or more operations may be performed simultaneously or in parallel, or one or more operations may be performed repeatedly multiple times.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by one or more processors, the method comprising:
receiving an application execute command associated with an application;
executing a main process of the application in response to the application execute command;
receiving information on a plurality of devices associated with the execution of the application;
executing, using the information on the plurality of devices, a sub-process for each of the plurality of devices, wherein the sub-processes are associated with the executed main process; and
based on a failure occurring in at least some of the plurality of devices, performing, using an idle device, fault tolerance associated with the execution of at least one of the sub-processes while maintaining the executed main process.

2. The method according to claim 1, wherein the receiving the information on the plurality of devices associated with the execution of the application comprises:
transmitting, to an orchestrator, a request for the information on the plurality of devices associated with the execution of the application; and
receiving information on a plurality of idle devices in response to the request for the information on the plurality of devices.

3. The method according to claim 2, wherein the executing the sub-process for each of the plurality of devices comprises:
generating a plurality of sub-processes using information on a quantity of devices indicated by the information on the plurality of idle devices, wherein a quantity of the plurality of sub-processes corresponds to the quantity of the plurality of devices;
mapping each of the plurality of generated sub-processes and a corresponding one of the plurality of devices;
generating an operation graph executed by each of the plurality of sub-processes;
allocating the generated operation graphs to a corresponding one of the plurality of sub-processes; and
executing, by each of the plurality of sub-processes, an operation associated with a corresponding one of the generated operation graphs.

4. The method according to claim 1, wherein the performing the fault tolerance comprises:
identifying failure occurrence information associated with a first device of the plurality of devices;
terminating a first sub-process associated with the first device; and
executing a second sub-process associated with a second device which is an idle device, and
wherein a task associated with the second sub-process corresponds to a task associated with the first sub-process.

5. The method according to claim 4, wherein the identifying the failure occurrence information associated with the first device of the plurality of devices comprises:
receiving, by a processor associated with the main process, the failure occurrence information associated with the first device from the first sub-process associated with the first device.

6. The method according to claim 4, wherein the identifying the failure occurrence information associated with the first device of the plurality of devices comprises:
determining, by a processor associated with the main process, that a failure has occurred in the first device, in response to not receiving a response from the first sub-process associated with the first device for a predetermined period of time after transmission of a connection status check request transmitted to the first sub-process.

7. The method according to claim 4, wherein the executing the second sub-process comprises:
identifying, by a processor associated with the main process, a latest checkpoint associated with the first device;
identifying, by the processor associated with the main process, an operation graph required for failure recovery associated with the first device; and
causing, by the processor associated with the main process, execution of the second sub-process associated with the second device using the latest checkpoint and the operation graph required for failure recovery, and
wherein the operation graph required for failure recovery comprises an operation graph from a time point associated with the latest checkpoint to a time point at which the failure occurs.

8. The method according to claim 7, wherein the causing the execution of the second sub-process associated with the second device using the latest checkpoint and the operation graph required for failure recovery comprises:
allocating, by the processor associated with the main process, the latest checkpoint and the operation graph required for failure recovery to the second sub-process;
restoring, by the second sub-process, data associated with the first device using the latest checkpoint; and
executing, by the second sub-process, an operation associated with the operation graph required for failure recovery.

9. A non-transitory computer-readable medium storing instructions that, when executed by one or more processors, cause performance of the method according to claim 1.

10. An information processing system, comprising:
a communication device;
one or more processors; and
memory storing instructions that, when executed by the one or more processors, cause the information processing system to:
receive an application execute command associated with an application;
execute a main process of the application in response to the application execute command;
receive information on a plurality of devices associated with the execution of the application;
execute, using the information on the plurality of devices, a sub-process for each of the plurality of devices; and
based on a failure occurring in at least some of the plurality of devices, perform, using an idle device, fault tolerance associated with the execution of at least one of the sub-processes while maintaining the executed main process.

* * * * *